US012682793B2

(12) United States Patent
Chen et al.

(10) Patent No.: US 12,682,793 B2
(45) Date of Patent: Jul. 14, 2026

(54) DYNAMIC DISPLAY OUTPUT ADJUSTMENT BASED ON USER'S LINE OF SIGHT

(71) Applicant: International Business Machines Corporation, Armonk, NY (US)

(72) Inventors: Dong Chen, Beijing (CN); Xiang Wei Li, Beijing (CN); Xiang Juan Meng, Beijing (CN); Ting Ting Zhan, Beijing (CN); Xiao Juan Chen, Beijing (CN); Ye Huo, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/379,160

(22) Filed: Oct. 12, 2023

(65) Prior Publication Data

US 2025/0124828 A1 Apr. 17, 2025

(51) Int. Cl.
G06V 40/16 (2022.01)
G06F 3/01 (2006.01)
G09G 3/00 (2006.01)

(52) U.S. Cl.
CPC ............. *G09G 3/001* (2013.01); *G06F 3/013* (2013.01); *G06V 40/168* (2022.01);
(Continued)

(58) Field of Classification Search
CPC .... G06V 40/16; G06V 40/161; G06V 40/165; G06V 40/168; G06V 40/169;
(Continued)

(56) References Cited

U.S. PATENT DOCUMENTS 7,401,920 B1 * 7/2008 Kranz ................ G02B 27/0093
382/117
2012/0092363 A1 * 4/2012 Kim ........................ G06F 3/147
345/618
(Continued)

FOREIGN PATENT DOCUMENTS

CN 103247072 B 8/2013
CN 102695011 A 2/2016
(Continued)

OTHER PUBLICATIONS

Wang, Z., et al., "Naked Eye Pseudo 3D Display Technology Outside the Screen," Journal of Physics: Conference Series, vol. 1098, 2018 2nd International Conference on Computer Graphics and Digital Image Processing, Jul. 2018.
(Continued)

*Primary Examiner* — Ke Xiao
*Assistant Examiner* — Nelson Lam
(74) *Attorney, Agent, or Firm* — Tihon Poltavets

(57) ABSTRACT

A method for correcting dimensional distortion when viewing a display at an angle is disclosed. In one embodiment, such a method identifies a line of sight of a user relative to a display. The method determines an angle of the line of sight relative to the display and a displacement of the user relative to the display. Using the angle and the displacement, the method determines an adjustment needed to reduce dimensional distortion of content on the display caused by the angle and the displacement. The method applies the adjustment to the content. In certain embodiments, applying the adjustment includes one or more of altering a size of the content on the display, altering proportions of the content on the display, and altering an orientation of the content on the display. A corresponding system and computer program product are also disclosed.

18 Claims, 12 Drawing Sheets

(52) U.S. Cl.
CPC . *G09G 2320/028* (2013.01); *G09G 2340/045* (2013.01); *G09G 2340/0492* (2013.01); *G09G 2340/14* (2013.01); *G09G 2354/00* (2013.01)

(58) Field of Classification Search
CPC .. G06V 40/171; G06V 40/172; G06V 40/173; G06V 40/174; G06V 40/175; G06V 40/176; G06V 40/178; G06V 40/18; G06V 40/19; G06V 40/193; G06V 40/197; G09G 2320/028; G09G 2320/06
USPC ......................................... 345/7–9, 156–158
See application file for complete search history.

(56) References Cited

U.S. PATENT DOCUMENTS

| | | | | |
|---|---|---|---|---|
| 2013/0044124 | A1* | 2/2013 | Reichert, Jr. .......... | H04N 5/272 345/618 |
| 2014/0092142 | A1* | 4/2014 | Boelter .................... | G09G 5/00 345/672 |
| 2015/0102995 | A1* | 4/2015 | Shen ........................ | G09G 5/00 345/156 |
| 2015/0170422 | A1* | 6/2015 | Aoyama ............... | G06T 15/005 345/8 |
| 2015/0221065 | A1* | 8/2015 | Kim ..................... | G09G 3/2092 345/660 |
| 2015/0317949 | A1* | 11/2015 | Cho ........................ | G09G 5/14 345/31 |
| 2016/0055617 | A1* | 2/2016 | McLaughlin ............. | G06T 3/04 345/666 |
| 2016/0077592 | A1 | 3/2016 | Bhesania et al. | |
| 2016/0148353 | A1* | 5/2016 | Birnbaum .............. | G09G 3/001 345/647 |
| 2023/0244309 | A1* | 8/2023 | Ahn ....................... | G06V 10/82 345/156 |
| 2023/0298197 | A1* | 9/2023 | Agrawal ................... | G06T 7/70 345/174 |
| 2023/0324988 | A1* | 10/2023 | Eble .......................... | G06T 7/70 345/156 |

FOREIGN PATENT DOCUMENTS

| | | |
|---|---|---|
| CN | 105759968 A | 7/2016 |
| CN | 106569611 A | 4/2017 |
| JP | 2013127672 A | 6/2013 |

OTHER PUBLICATIONS

Cabanier, R. WebXR Device API Explained. https://github.com/immersive-web/webxr/blob/master/explainer.md <Retrieved from the internet on Jun. 25, 2024>.

Youke Technology (2022) ThingJS: Low-code practice of the metaverse. https://www.bilibili.com/read/cv17508107/ <Retrieved from the internet on Jun. 25, 2024>.

* cited by examiner

100

Computer  101

Processor Set  110

| Processing Circuitry  120 | Cache  121 |
|---|---|

Communication Fabric  111

Volatile Memory  112

Persistent Storage 113

| Operating System  122 | Display Adjustment Module  150 |
|---|---|

Peripheral Device Set  114

| UI Device Set  123 | Storage  124 | IoT Sensor Set  125 |
|---|---|---|

Network Module  115

WAN
102

End User Device  103

Remote Server  104

Remote Database  130

Private Cloud  106

Gateway  140

Public Cloud  105

Cloud Orchestration Module  141

Host Physical Machine Set  142

Virtual Machine Set  143

Container Set  144

Fig. 1

200

```
┌────────────────────────────────────────────────────────────────────┐
│                    Display Adjustment Module  150                    │
│                                                                      │
│   ┌──────────────┐  ┌──────────────┐       ┌──────────────┐         │
│   │              │  │              │       │              │         │
│   │   Personal   │  │   Personal   │       │   Personal   │         │
│   │ Dictionary 1 │  │ Dictionary 2 │  ···  │ Dictionary n │         │
│   │     208a     │  │     208b     │       │     208c     │         │
│   │              │  │              │       │              │         │
│   └──────┬───────┘  └──────┬───────┘       └──────┬───────┘         │
│          ↕                 ↕                      ↕                 │
│   ◄──────┼─────────────────┼──────────────────────┼──────────►      │
│          ↕                 ↕                      ↕                 │
│   ┌──────┴───────┐  ┌──────┴───────┐       ┌──────┴───────┐         │
│   │Sight Capture │  │  3-D Angle   │       │Area Calculation│       │
│   │and Recognition│ │Calculation and│      │and Adjustment │        │
│   │   Module     │  │  Adjustment  │       │ Module  216   │        │
│   │     212      │  │   Module     │       │              │         │
│   │              │  │     214      │       │              │         │
│   └──────────────┘  └──────────────┘       └──────────────┘         │
│                                                                      │
├──────────────────────────────────────────────────────────────────────┤
│                    Application Platform  206                         │
├──────────────────────────────────────────────────────────────────────┤
│                          Drivers  204                               │
├──────────────────────────────────────────────────────────────────────┤
│                         Hardware  202                               │
└──────────────────────────────────────────────────────────────────────┘
```

| Facing the User's Line of Sight, Dynamically Create a Three-Dimensional Rectangular Coordinate System, and Obtain the Point Coordinate Information of the Offset Interface    602 |

| According to the Three-Dimensional Point Information in the Data Analysis Model, Calculate the Displacement Distance and Angle Deviation as Follows:    604 |

Calculate the Center of the Image:    606

$$Q\ (x_0,\ y_0,\ z_0)\qquad x_0 = \frac{1}{4}*\sum_{i=1}^{i=4} x_i \qquad y_0 = \frac{1}{4}*\sum_{i=1}^{i=4} y_i \qquad z_0 = \frac{1}{4}*\sum_{i=1}^{i=4} z_i$$

Define a Plate with Two Vectors which are not Parallel as Follows:

$$\overrightarrow{QA} = (x_1 - x_0, y_1 - y_0, z_1 - z_0)$$

$$\overrightarrow{QB} = (x_2 - x_0, y_2 - y_0, z_2 - z_0)$$

608

Use $\overrightarrow{QA}$ and $\overrightarrow{QB}$ to Define the Plate P as Follows:

$$P:\ \begin{pmatrix} x \\ y \\ z \end{pmatrix} = \begin{pmatrix} x_0 \\ y_0 \\ z_0 \end{pmatrix} + \lambda \begin{pmatrix} x_1 - x_0 \\ y_1 - y_0 \\ z_1 - z_0 \end{pmatrix} + \mu \begin{pmatrix} x_2 - x_0 \\ y_2 - y_0 \\ z_2 - z_0 \end{pmatrix} ,\quad \text{where } \lambda \text{ and } \mu \text{ are constants}$$

610

Calculate a Normal Vector $\vec{V}$ of the Plate P, $\vec{V}\ (m,\ n,\ r)$
Since $\vec{V}$ is the Normal Vector, $\vec{V}$ Should be Normal to any Vector in the Plate.
In this Case, Select $\overrightarrow{QA}$ to Calculate $\vec{V}$ as Follows:

$$\vec{V} \cdot \overrightarrow{QA} = 0$$

Calculate m, n, and r as follows:

In Accordance with the Determined Displacement and Angle, Perform Three-Dimensional Correction and Repair of the Image, and Project the Repaired Image as Follows:    702

After Processing, the Vector $\vec{V}'$ Will be Parallel to the Plane $(0, 0, 1)$ and the Plate $P'$ Will be the Projection of the Plate P onto the Plate XY. Thus:

$$cos\omega = \frac{m}{|\vec{V}|} \qquad cos\alpha = \frac{n}{|\vec{V}|}$$

$$\overrightarrow{QA'} = [cos\omega \cdot, cos\alpha \cdot (y_1 - y_0), \; z_1 - z_0]$$

$$\overrightarrow{QB'} = [cos\omega \cdot (x_2 - x_0), cos\alpha \cdot (y_2 - y_0), \; z_2 - z_0]$$

$$\overrightarrow{QC'} = [cos\omega \cdot (x_3 - x_0), cos\alpha \cdot (y_3 - y_0), \; z_3 - z_0]$$

$$\overrightarrow{QD'} = [cos\omega \cdot (x_4 - x_0), cos\alpha \cdot (y_4 - y_0), \; z_4 - z_0]$$

Since $$\overrightarrow{oA'} = \overrightarrow{oQ} + \overrightarrow{QA'}$$

$$A' = [cos\omega \cdot (x_1 - x_0) + x_0, \; cos\alpha \cdot (y_1 - y_0) + y_0, \; z_1 - z_0 + z_0]$$

$$= [cos\omega \cdot x_1 + (1 - cos\omega) x_0, \; cos\alpha \cdot y_1 + (1 - cos\alpha)y_0, \; z_1]$$

$$B' = [cos\omega \cdot x_2 + (1 - cos\omega) x_0, \; cos\alpha \cdot y_2 + (1 - cos\alpha)y_0, \; z_2]$$

704

Thus, Every Point in the Plate P Will Update in the Formula:

$$T \, (x_i, y_i, z_i)$$

$$T' = [cos\omega \cdot x_i + (1 - cos\omega) x_0, \; cos\alpha \cdot y_i + (1 - cos\alpha)y_0, \; z_i]$$    706

Calculate the Original Screen Footprint  1102

Calculate the Current Screen Area  1104

Get the Screen Area Ratio Value (t) 1106

Expand the Current Screen Area Proportionally  1108

Truncation Occurred? 1110

N

Y

Update Scale Value (t)  1112

Proceed to Graph Mapping Module  1114

DYNAMIC DISPLAY OUTPUT ADJUSTMENT BASED ON USER'S LINE OF SIGHT

BACKGROUND

Field of the Invention

This invention relates generally to displays, and more specifically to systems and methods for dynamically adjusting display output based on a user's line of sight and position relative to the display.

Background of the Invention

Displays, also known as monitors or screens, serve as essential visual interfaces between users and the digital world. These devices are used for a multitude of purposes, making them ubiquitous. Displays provide users with the means to interact with computing devices (e.g., personal computers, laptops, televisions, smart phones, tablets, virtual/augmented reality glasses, etc.), from basic text-based tasks to complex graphic design and gaming experiences. They also enable users to view and manipulate data, software applications, and multimedia content, creating an important gateway to the digital world.

Displays find numerous applications in the business world, including for presentations, data analysis, video conferencing, and facilitating communication and decision-making. In education, displays aid in e-learning to enable students to access educational materials and engage with online resources. Moreover, they may serve as information kiosks, digital signage, and entertainment platforms in public spaces. In essence, displays are versatile tools that provide functionality in a wide variety of different domains. Any improvement to display technology has the potential to benefit the various domains in which they are used.

SUMMARY

The invention has been developed in response to the present state of the art and, in particular, in response to the problems and needs in the art that have not yet been fully solved by currently available systems and methods. Accordingly, systems and methods have been developed for correcting dimensional distortion when viewing a display at an angle. The features and advantages of the invention will become more fully apparent from the following description and appended claims, or may be learned by practice of the invention as set forth hereinafter.

Consistent with the foregoing, a method for correcting dimensional distortion when viewing a display at an angle is disclosed. In one embodiment, such a method identifies a line of sight of a user relative to a display. This line of sight may, in certain embodiments, be inferred from facial characteristics of the user. The method determines an angle of the line of sight relative to the display and a displacement of the user relative to the display. Using the angle and the displacement, the method determines an adjustment needed to reduce dimensional distortion of content on the display caused by the angle and the displacement. The method applies the adjustment to the content. In certain embodiments, applying the adjustment includes one or more of altering a size of the content on the display, altering proportions of the content on the display, and altering an orientation of the content on the display.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 1 is a high-level block diagram showing one example of a computing system for use in implementing embodiments of the invention;

FIG. 2 is a high-level block diagram showing a schematic of a system and method in accordance with the invention;

FIG. 6 is a process flow diagram showing a method for calculating a displacement distance and angle deviation for a display;

FIG. 7 is a process flow diagram showing a method for performing three-dimensional correction and repair of an image, and projecting the corrected and repaired image;

DETAILED DESCRIPTION

Figure 3:
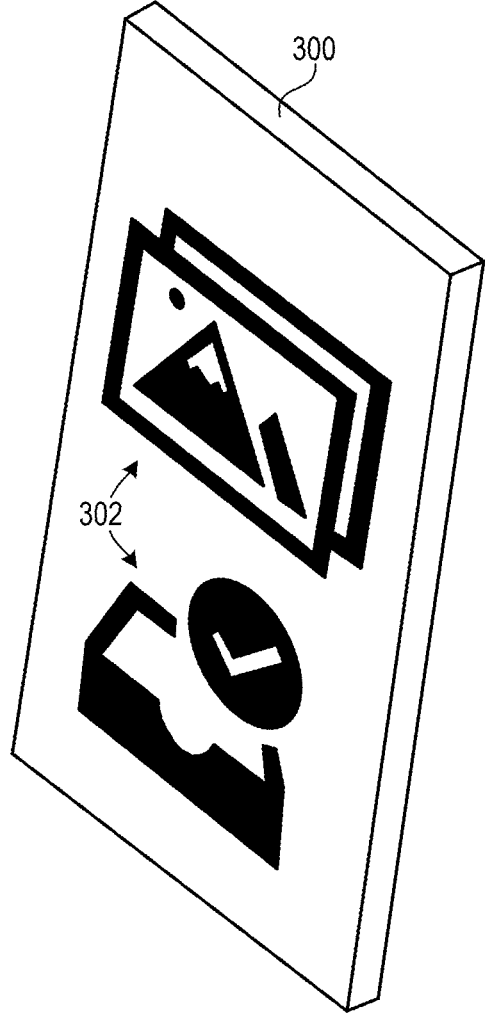
FIG. 3 is a perspective view showing an example of how content may appear on a display to a user when viewed from an angle.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 150 (i.e., a "display adjustment module 150") for correcting dimensional distortion when viewing a display at an angle. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring to FIG. 2, as previously mentioned, when viewing a display at an angle, one may experience dimensional distortion in addition to color and contrast issues. This type of distortion arises from the changes in pixel orientation and alignment as the viewing angle shifts. Displays consist of a grid of pixels, with each pixel emitting light independently to form images. When observed straight-on, pixels appear as square elements, rendering images with accurate proportions. However, when the same display is viewed from an angle, the pixels may appear elongated or compressed due to the oblique angle of view. This effect can lead to images and text appearing stretched vertically or compressed horizontally, resulting in a distorted sense of dimensionality, and making it challenging to perceive accurate proportions, particularly when dealing with diagrams, graphs, or 3D models.

Moreover, the extent of dimensional distortion can vary depending on the display technology in use. For instance, Twisted Nematic (TN) panels, commonly found in budget monitors, tend to exhibit more pronounced dimensional distortion when viewed off-axis compared to In-Plane Switching (IPS) panels. IPS panels are designed to provide better viewing angles and minimize this type of distortion. Nevertheless, regardless of the type of display that is used, the problem with dimensional distortion when viewing at an angle persists.

In certain embodiments in accordance with the invention, a display adjustment module 150 may be provided to correct dimensional distortion when viewing a display at an angle. FIG. 2 is a high-level block diagram showing a schematic of one embodiment of a system 200 in accordance with the invention. As shown, the system 200 may include a display adjustment module 150 that includes components or modules that are responsible for providing specific functions thereto. This display adjustment module 150 may operate on an application platform 206, such as an operating system to provide basic services and functionality when executing the display adjustment module 150. Drivers 204 may enable communication between the application platform 206 (e.g., operating system) and hardware 202 to enable the application platform 206 to understand and control the hardware 202 effectively.

As mentioned above, the display adjustment module 150 may be configured to correct dimensional distortion when viewing a display at an angle. The display adjustment module 150 may utilize or reference one or more other modules in order to provide this functionality. These modules may be embodied as separate modules or incorporated into the display adjustment module 150. For example, the display adjustment module 150 may reference one or more personal dictionaries which may contain different user requirements for content display, including but not limited to text size.

A sight capture and recognition module 212 may be configured to identify a line of sight of a user relative to a display. In certain embodiments, this may be accomplished using a camera and inferring the line of sight from facial characteristics of the user. For example, the sight capture and recognition module 212 may determine the angle and/or orientation of a user's face from facial characteristics so that the angle of the line of sight relative to a display can be determined from these facial characteristics. As will be explained in more detail hereafter, this may enable adjustments to be made to content on the display to assist the user in viewing the content. Other techniques for determining a line of sight and angle thereof relative to a display may be possible and within the scope of the invention.

A 3-D angle calculation and adjustment module 214 may be configured to determine the angle referenced above and adjust content on the display to compensate for this angle. For example, the 3-D angle calculation and adjustment module 214 may adjust the dimensions/proportion of content on the display to correct for dimensional distortion caused by a user viewing content at a non-perpendicular angle relative to the display. Similarly, the area calculation and adjustment module 216 may adjust the size of content in accordance with usable area on the display to assist a user in viewing the content. For example, this may be accomplished by determining an area of the display in which content may be presented and adjusting the content to fill this area as much as possible to assist a user in viewing the content.

FIG. 3 is a perspective view showing an example of how content 302 may appear to a user on a display 300 when viewed from a non-perpendicular angle. As shown, when viewed from a non-perpendicular angle, the content 302 may be dimensionally distorted. More specifically, the content 302 may appear to be stretched or compressed vertically and/or horizontally, resulting in a distorted sense of dimensionality and making it challenging to perceive accurate proportions.

Figure 4:
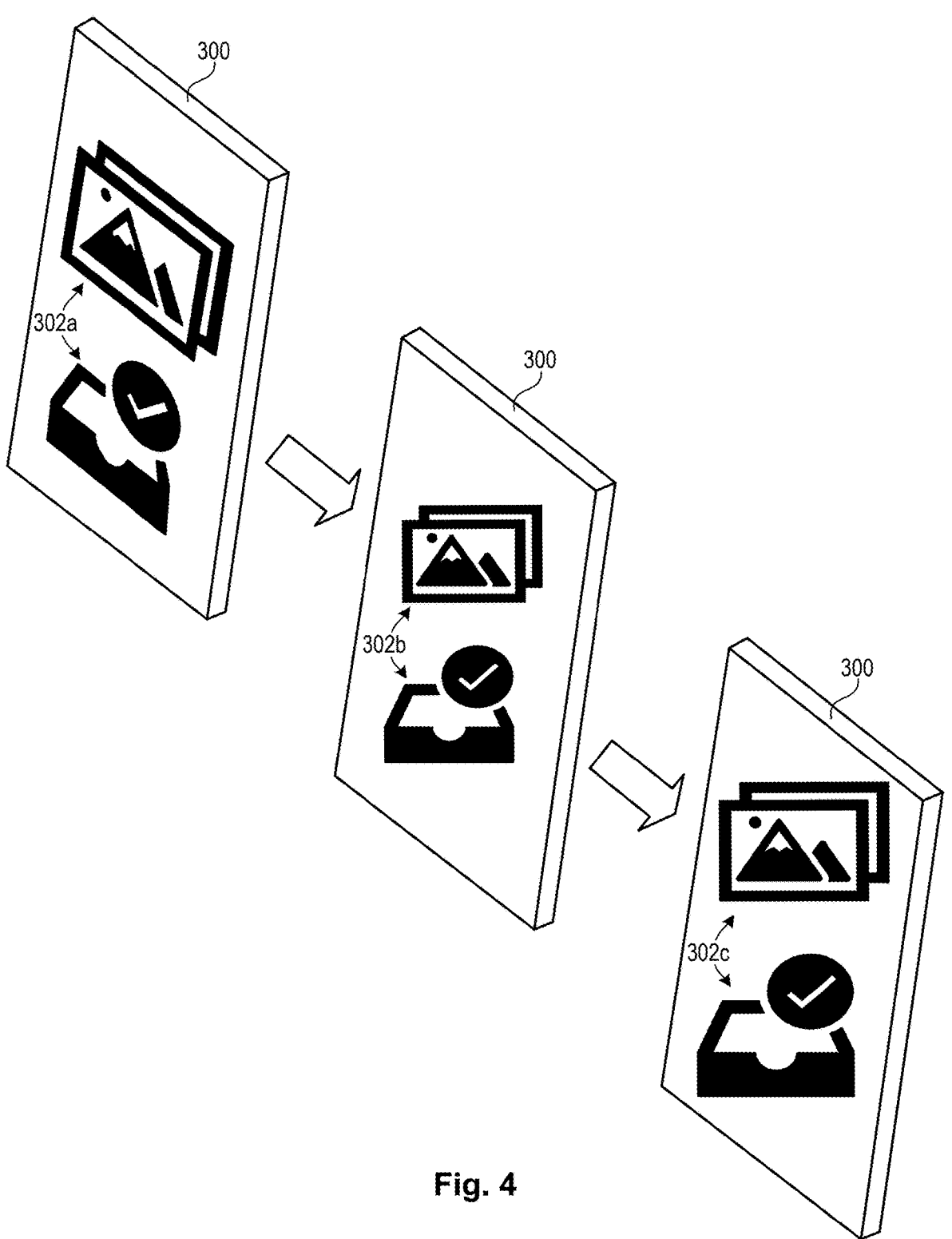
FIG. 4 is a perspective view showing an example of how the content of FIG. 3 may appear to the user after adjustment by the display adjustment module.

FIG. 4 is a perspective view showing an example of how the content 302 of FIG. 3 may appear to the user after adjustment by the display adjustment module 150. As shown, the display adjustment module 150 may initially determine the line of sight to the content 302a and the angle thereof. The display adjustment module 150 may then alter the proportions of content 302a to yield adjusted content 302b. In certain embodiments, this adjusted content 302b may appear as if the user is looking directly at the display 300 at a perpendicular angle, even though the user is actually looking from a non-perpendicular angle. In certain embodiments, the display adjustment module 150 may also adjust the size of the adjusted content 302*b* to yield size-adjusted content 302*c* depending on how much space is available on the display 300. This may provide a better viewing experience when viewing content 302 at a non-perpendicular angle.

Figure 5:
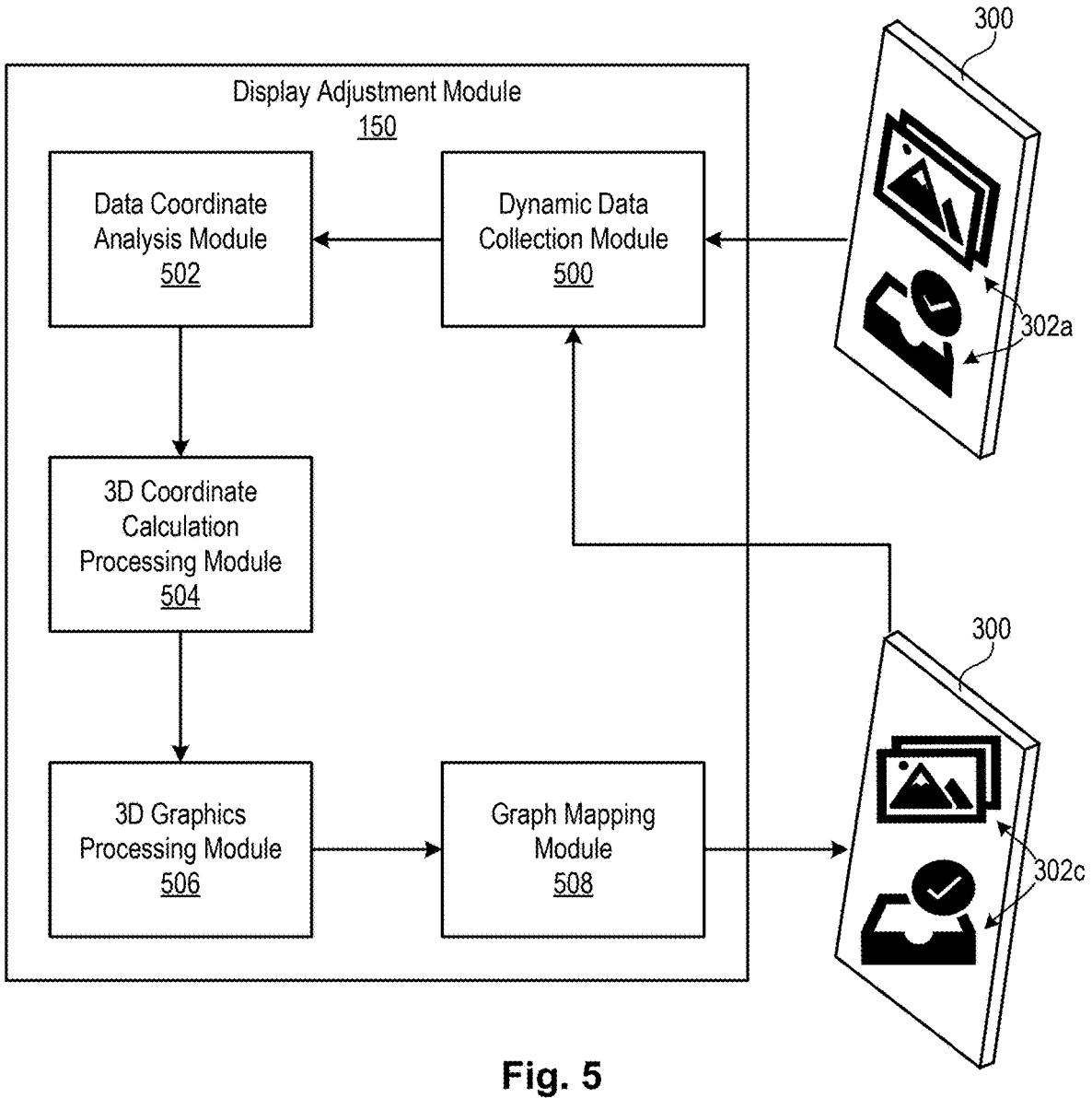
FIG. 5 is a high-level block diagram showing various sub-modules that may be included in a display adjustment module in accordance with the invention.

FIG. 5 is a high-level block diagram showing various sub-modules that may be included in a display adjustment module 150 in accordance with the invention. The modules may be implemented in hardware, software, firmware, or combinations thereof. The modules are presented by way of example and not limitation. More or fewer modules may be provided in different embodiments. For example, the functionality of some modules may be combined into a single or smaller number of modules, or the functionality of a single module may be distributed across several modules.

The functionality of the modules illustrated in FIG. 5 may overlap with the functionality of the modules illustrated in FIG. 2. As shown, a dynamic data collection module 500 may continuously collect data with respect to a display 300, content 302*a* presented on the display 300, a user's line of sight relative to the display 300, a displacement distance of the user relative to the display 300, and the like. As can be appreciated, content 302*a* on the display 300 may frequently change and the user's line of sight and displacement distance with respect to the display 300 may also change as one or more of the orientation/position of the user and/or display 300 changes. Data describing any or all of these changes may be monitored and collected by the dynamic data collection module 500.

The data coordinate analysis module 502 may determine the coordinates of the content 302*a* (e.g., image 302*a*) relative to a three-dimensional (3D) coordinate system that is oriented relative to the user's line of sight. For example, in certain embodiments, a z-axis of the three-dimensional coordinate system may be parallel to the user's line of sight, and the x and y axes may be in a plane that is normal to the user's line of sight. Using this coordinate system, the 3D coordinate calculation processing module 504 may calculate the angular offset and displacement of the content 302*a* relative to the three-dimensional coordinate system. The 3D coordinate calculation processing module 504 may then calculate the adjustment that is needed to display the content 302 to the user such that the content 302 appears to be normal to the user's line of sight even thought it is still being viewed from an angle.

The 3D graphics processing module 506 may then take the adjusted content 302 generated by the 3D coordinate calculation processing module 504 and adjust the size of the content to fit the available space. To avoid truncation (i.e., the size being expanded to an extent that it falls outside of the viewable space), a scale value may be dynamically adjusted. Once a desired size is determined, the graph mapping module 508 may present the adjusted content 302*c* on the display 300 based on a personal dictionary 208 associated with a user.

Figure 8:
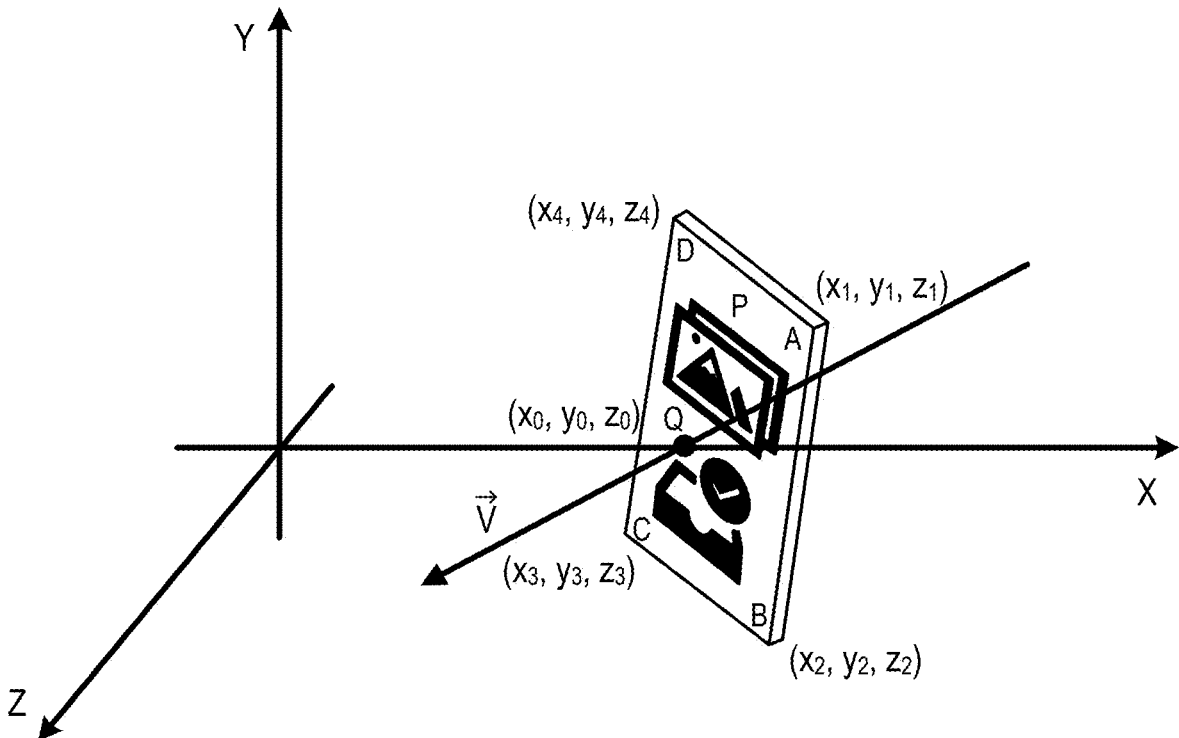
FIG. 8 is a three-dimensional rendering showing calculation of a vector that is perpendicular to the display.

Referring to FIG. 6, while also referring generally to FIG. 8, a process flow diagram showing a method 600 for calculating a displacement distance and angle deviation for a display 300 is illustrated. Facing a user's line of sight, the method 600 dynamically creates 602 a three-dimensional rectangular coordinate system and obtains 602 point coordinate information of the offset interface, as shown in FIG. 8. According to the three-dimensional information in the data analysis model, the method 600 calculates 604 the displacement distance and angle deviation. To accomplish this, the method 600 may initially calculate 606 the center (Q) of the image (i.e., content 302) using, for example, the equations shown in step 606. The method 600 may then define a plate with two vectors (e.g., $\overrightarrow{QA}$ and $\overrightarrow{QB}$) using, for example, the equations set forth in step 608. Using the vectors $\overrightarrow{QA}$ and $\overrightarrow{QB}$,, the method 600 may define 310 a plate P using, for example, the equations set forth in step 610. The method 600 then calculates 612 a normal vector $\overrightarrow{V}$ of the plate P. In the illustrated step 612, the method 600 calculates the components (m, n, r) of vector $\overrightarrow{V}$ using the illustrated equations.

Figure 9:
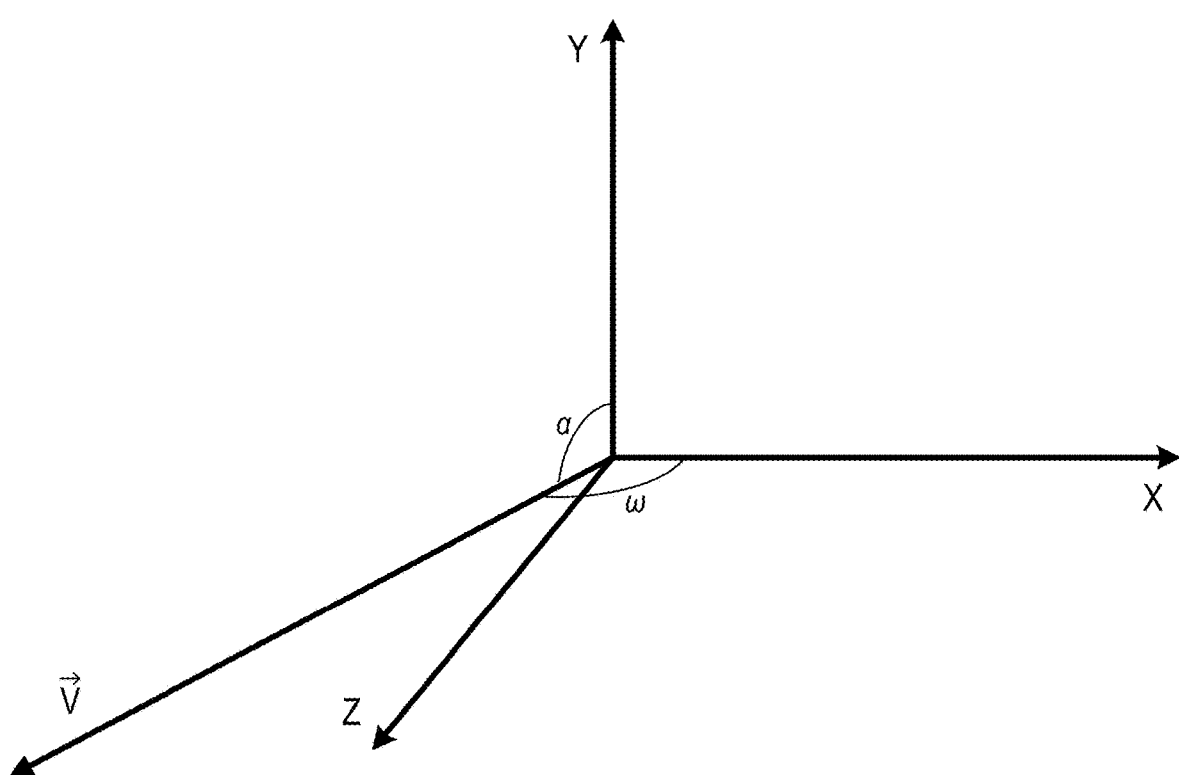
FIG. 9 is a three-dimensional rendering showing the vector of FIG. 9 relative to a three-dimensional coordinate system.
Figure 10:
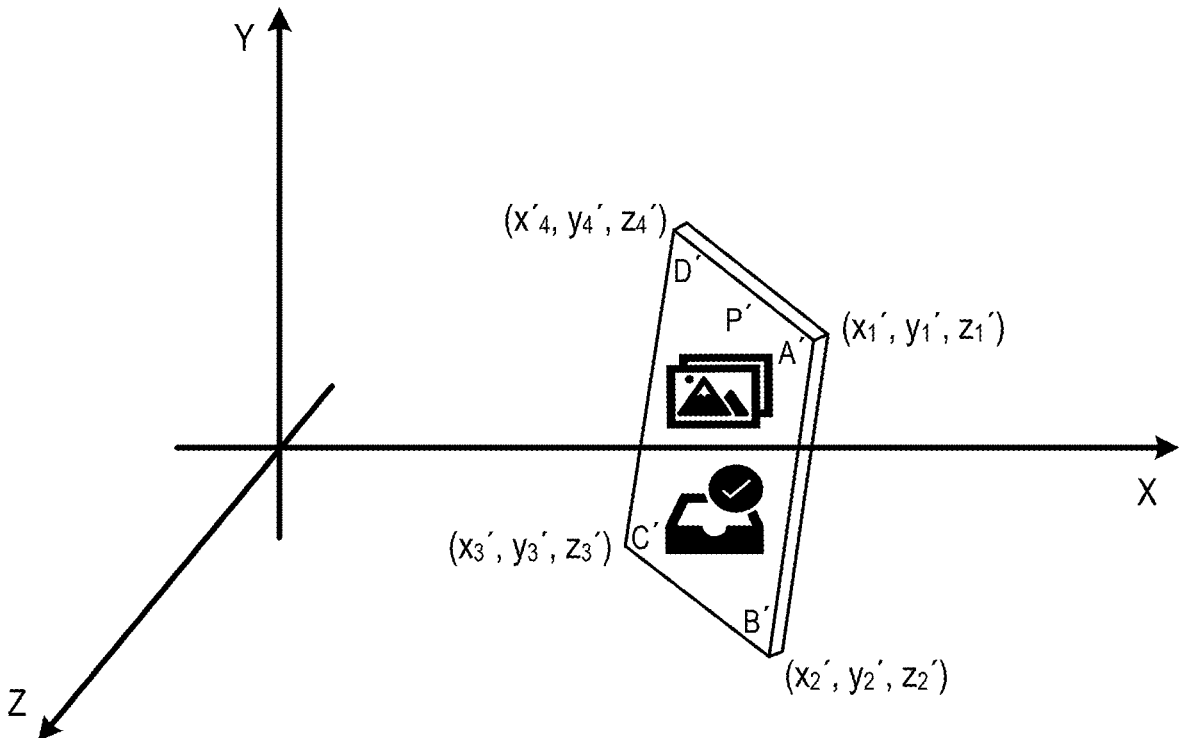
FIG. 10 is a three-dimensional rendering showing the image after it has been adjusted by the display adjustment module.

Referring to FIG. 7, while also referring generally to FIGS. 9 and 10, in accordance with the determined displacement and angle, a method 700 continues from the method 600 of FIG. 6 by performing three-dimensional correction and repair of the image (i.e., content 302), and projects the repaired image as set forth in FIG. 7. More specifically, after processing, a vector $\overrightarrow{V}'$ will be parallel to the plane (0,0,1) and the plate P' will be the projection of the plate P onto the plate XY, as indicated by the equations set forth in step 704 and shown in FIGS. 9 and 10. As a result, every point in the plate P will update in accordance with the formula set forth in step 706.

Figure 11:
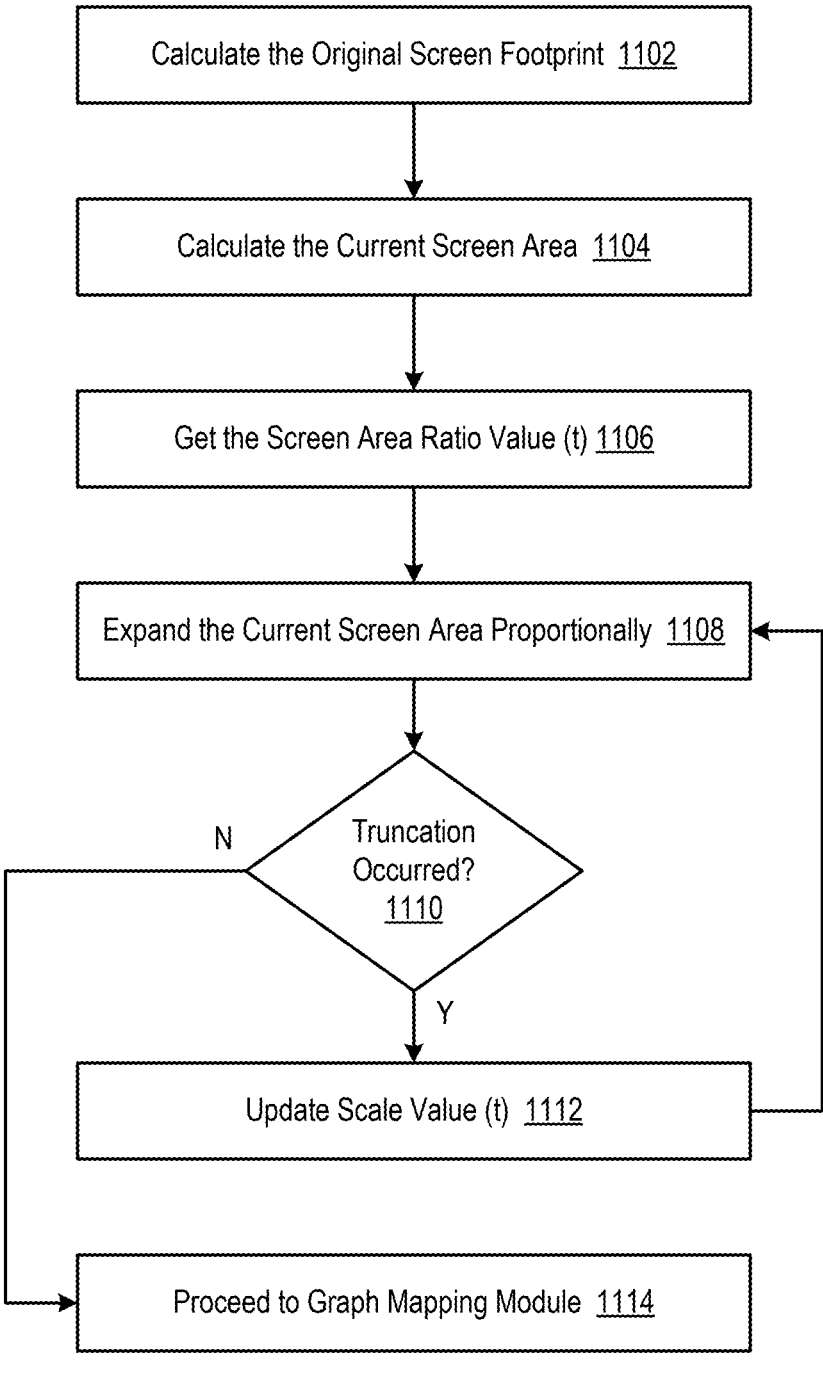
FIG. 11 is a process flow diagram showing one embodiment of a method that may be executed by the display adjustment module to adjust the size of content.
Figure 12A:
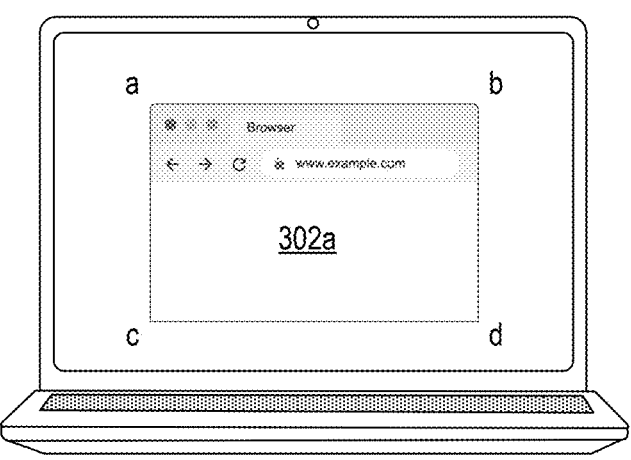
FIGS. 12A-C show how an image may be altered and resized by the display adjustment module for viewing from an angle.
Figure 12B:
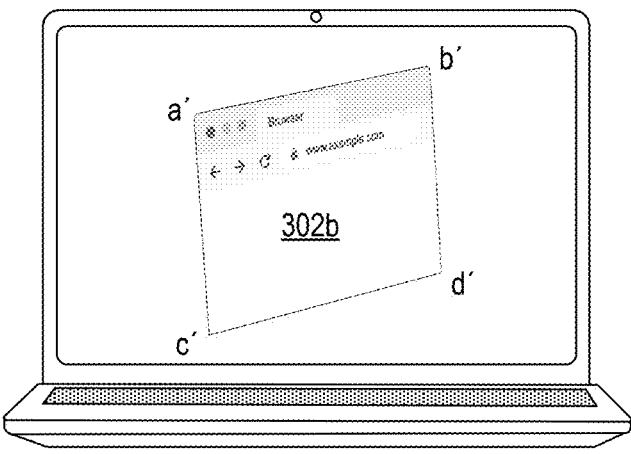
Figure 12C:
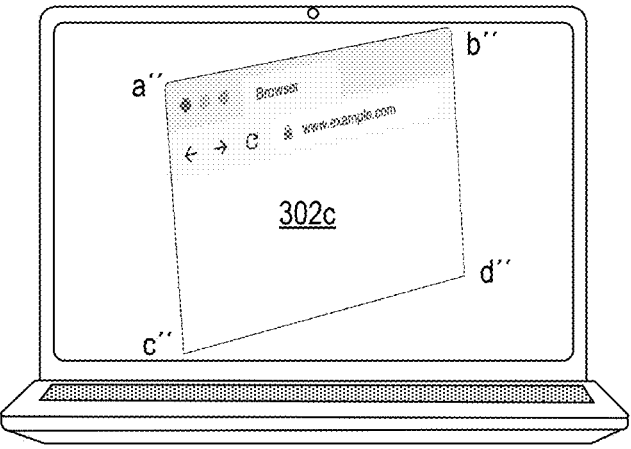

Referring to FIG. 11, while also referring generally to FIGS. 12A-C, one embodiment of a method 1100 for adjusting the size of content 302 is illustrated. FIGS. 12A-C are intended to provide a visual representation of what is occurring with the method 1100 of FIG. 11. As shown, the method 1100 may initially calculate 1102 an original screen footprint (S) for content 302, as shown in FIG. 12A with coordinates a, b, c, and d. The original screen footprint (S) may be calculated using the equation S=ac*ab. The method 1100 may then calculate 1104 the current screen footprint (S') after adjustments (excluding size adjustments) have been made, as shown in FIG. 12B and coordinates a', b', c', and d'. The current screen footprint (S') may be calculated using the equation S'=a'c'*a'b'.

The method 1100 then determines 1106 a screen area ratio value (t), which may be calculated using the following equation: t=S'/S. The method 1100 may then expand 1108 the current screen area proportionally to the ratio value (t). The expanded screen area (S") may be calculated using the equation S"=S'/t. If truncation occurs at step 1110, meaning that the expanded screen area (S") extends beyond the viewable area, the method 1100 may update 1112 the scale (i.e., ratio) value (t) such as by increasing it value until the expanded screen area (S") with coordinates a", b", c", and d" falls within the viewable area, as shown in FIG. 12C. At this point, the method 1100 may proceed 1114 to the graph mapping module 508 as previously discussed in association with FIG. 5 to present the size-adjusted content 302*c* on the display 300.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method comprising:

identifying a line of sight of a user relative to a display having an original screen footprint;

determining an angle of the line of sight relative to the display;

determining a displacement distance of the user relative to the display;

calculating a current screen footprint based on the angle of the line of sight relative to the display and the displacement distance of the user relative to the display;

determining a screen area ratio value for the current screen footprint;

expanding the current screen footprint proportionally to the screen area ratio value to form an expanded screen area;

using the angle of the line of sight relative to the display and the displacement distance of the user relative to the display, determining an adjustment needed to correct dimensional distortion of content on the display caused by the angle of the line of sight relative to the display and the displacement distance of the user relative to the display; and performing the adjustment to the content, wherein the content with the adjustment is displayed within the expanded screen area.

2. The method of claim 1, wherein the performing the adjustment further comprises altering a size of the content on the display.

3. The method of claim 1, wherein the performing the adjustment further comprises altering proportions of the content on the display.

4. The method of claim 1, wherein the performing the adjustment further comprises altering an orientation of the content on the display.

5. The method of claim 1, wherein the identifying the line of sight further comprises identifying facial characteristics of the user.

6. The method of claim 5, further comprising:

inferring the line of sight from the facial characteristics.

7. A computer program product comprising:

one or more non-transitory computer readable storage media; and program instructions stored on the one or more non-transitory computer readable storage media to perform operations comprising:

identifying a line of sight of a user relative to a display having an original screen footprint;

determining an angle of the line of sight relative to the display;

determining a displacement distance of the user relative to the display;

calculating a current screen footprint based on the angle of the line of sight relative to the display and the displacement distance of the user relative to the display;

determining a screen area ratio value for the current screen footprint;

expanding the current screen footprint proportionally to the screen area ratio value to form an expanded screen area;

using the angle of the line of sight relative to the display and the displacement distance of the user relative to the display, determining an adjustment needed to correct dimensional distortion of content on the display caused by the angle of the line of sight relative to the display and the displacement distance of the user relative to the display; and performing the adjustment to the content, wherein the content with the adjustment is displayed within the expanded screen area.

8. The computer program product of claim 7, wherein the performing the adjustment comprises:

altering a size of the content on the display.

9. The computer program product of claim 7, wherein the performing the adjustment comprises:

altering proportions of the content on the display.

10. The computer program product of claim 7, wherein the performing the adjustment comprises:

altering an orientation of the content on the display.

11. The computer program product of claim 7, wherein the identifying the line of sight comprises:

identifying facial characteristics of the user.

12. The computer program product of claim 11, wherein the operations further comprise:

inferring the line of sight from the facial characteristics.

13. A computer system comprising:

a processor set;

one or more computer readable storage media; and program instructions stored on the one or more computer readable storage media to cause the processor set to perform operations comprising:

identifying a line of sight of a user relative to a display having an original screen footprint;

determining an angle of the line of sight relative to the display;

determining a displacement distance of the user relative to the display;

calculating a current screen footprint based on the angle of the line of sight relative to the display and the displacement distance of the user relative to the display;

determining a screen area ratio value for the current screen footprint;

expanding the current screen footprint proportionally to the screen area ratio value to form an expanded screen area;

using the angle of the line of sight relative to the display and the displacement distance of the user relative to the display, determining an adjustment needed to correct dimensional distortion of content on the display caused by the angle of the line of sight relative to the display and the displacement distance of the user relative to the display; and performing the adjustment to the content, wherein the content with the adjustment is displayed within the expanded screen area.

14. The computer system of claim 13, wherein the performing the adjustment comprises:

altering a size of the content on the display.

15. The computer system of claim 13, wherein the performing the adjustment comprises:

altering proportions of the content on the display.

16. The computer system of claim 13, wherein the performing the adjustment comprises:

altering an orientation of the content on the display.

17. The computer system of claim 13, wherein the identifying the line of sight comprises:

identifying facial characteristics of the user.

18. The computer system of claim 17, wherein the operations further comprise:

inferring the line of sight from the facial characteristics.

* * * * *